United States Patent [19]

Goforth

[11] Patent Number: 4,488,334
[45] Date of Patent: Dec. 18, 1984

[54] U-BOLT CLAMP SADDLE CONSTRUCTION AND METHOD OF MANUFACTURE

[75] Inventor: Ronald D. Goforth, Bloomfield Hills, Mich.

[73] Assignee: Metal Craft Company, Troy, Mich.

[21] Appl. No.: 338,698

[22] Filed: Jan. 11, 1982

[51] Int. Cl.³ .............................................. F16L 33/10
[52] U.S. Cl. ..................................... 24/277; 285/199; 285/420
[58] Field of Search ............. 24/135 N, 243 B, 243 E, 24/275, 276, 277; 248/62; 403/398, 399; 285/197, 199, 420

[56] References Cited

U.S. PATENT DOCUMENTS

| | | | |
|---|---|---|---|
| 2,719,345 | 10/1955 | Riker | 24/277 |
| 3,055,072 | 9/1962 | Brown | 24/277 |
| 3,605,214 | 9/1971 | Spotts et al. | 24/277 |
| 3,984,134 | 10/1976 | Engman et al. | 24/277 X |
| 4,063,336 | 12/1977 | Jones et al. | 24/277 |
| 4,122,586 | 10/1978 | Nothdurft | 24/277 |
| 4,270,251 | 6/1981 | Evans et al. | 24/277 |

*Primary Examiner*—Robert P. Swiatek

*Attorney, Agent, or Firm*—Remy J. VanOphem

[57] ABSTRACT

A U-bolt clamp saddle construction is disclosed particularly adapted for applications such as clamping catalytic converter pipe connections requiring a rigid saddle. The saddle clamp is of two-piece welded construction, each piece being formed of sheet steel with a square-sided channel on either side, each piece also having an intermediate web having a semicircular cutout adapted to engage the pipe diameter to be clamped. The outer edges of each of the channels are abutted by positioning the pieces together, which pieces are then welded at weld projections located along the edges and on the web to form a high strength flangeless saddle construction for maximum clearance at installation of the clamp. The square-sided channel allows clearance for weld flash, while enabling standard sized nuts to be used. A tab portion is formed on one of the pieces which is folded about the bottom edge and against the face of the other piece to create rigidity of the saddle during clamping adequate for good sealing pressure while affording sufficient yieldability for optimum interfitting with the pipe connection to be clamped.

8 Claims, 5 Drawing Figures

U-BOLT CLAMP SADDLE CONSTRUCTION AND METHOD OF MANUFACTURE

BACKGROUND OF THE INVENTION

This invention concerns U-bolt saddle clamps of the type commonly employed in clamp pipe connections for exhaust systems of vehicles powered by internal combustion engines.

Conventionally, U-bolt saddle clamps are used, in which a U-shaped bolt member has threaded ends received through tubular openings formed in a saddle member, with central semi-circular cutouts complementing the radiused portion of the U-bolt, to enable clamping at a pipe section by tightening of locknuts received on the ends of the U-bolt protruding through the tubular portions of the saddle.

Many low-cost and effective designs for such U-bolt saddle clamps have been provided in the prior art for conventional exhaust system applications.

With the introduction of catalytic converters, however, clamping the connections to the converter has presented a more difficult problem. The material employed in the catalytic converter connections consists of relatively heavy walled stainless steel, which requires high clamping forces to compress properly, in turn imposing high stresses on the saddle used at such a connection. At the same time, the connection must be very tight to prevent leakage resulting in poor performance of the converter.

The conventional U-bolt saddle clamps have not had sufficient saddle rigidity to withstand the degree of tightening necessary for this application. Accordingly, relatively more rigid saddle clamp designs have been developed that are capable of withstanding the relatively high forces created during clamping.

Typical examples of high rigidity saddles are shown in U.S. Pat. No. 3,955,250, to Heckethorn; U.S. Pat. No. 4,040,152 to Gilgallon; U.S. Pat. No. 4,249,759, also to Heckethorn; and, finally U.S. Pat. No. 4,112,586, to Nothdurft.

In the Nothdurft U.S. Pat. No. 4,122,586 there is provided a one-piece developed sheet metal preform which is folded to form a double thickness saddle with a partially circular cutout on one side thereof, and a relatively straight edge at the fold between the opposite components. A pair of horizontal stiffener ribs are also provided. The U-bolt receiving tubular openings are formed by semicircular channels formed on either side of each of the folded sections. Adjacent each of the channels is an outer flange which is placed face-to-face and welded together in order to provide the unitary clamp structure. Spot welds are also applied in the overlying webs intermediate to the formed channels.

The resultant saddle clamp, however, is relatively difficult to form due to the one-piece construction and, in addition, the outer flanges created excessive radial dimensions which in turn creates problems of sufficient clearance at installation.

Also, the spot-welds of the flanges and the intermediate webs of the saddle are often imperfectly made since the welding is done as the halves of the saddle preform are compressed together in the welding apparatus, and upon release of the pressure a slight spring-back may produce arcing, and separation of the welds or at best incomplete welds.

Most importantly, the rigidity of Northdurft and the other designs has been found to be excessive, in that if the pipe connection is out-of-round or otherwise varies in size or shape, the stiffness of the saddle section does not allow conforming deflection thereof. This results in reduced radial deflection along the line of contact, and less reliable sealing of the joint.

In U.S. Pat. No. 3,055,072 to Brown there is disclosed a two-piece flangeless saddle design, in which channels are formed on either side of each piece, which are abutted and welded to form the tubular design. However, the web sections are of inadequate rigidity for application to high force applications heretofore described. Furthermore, weld flash along the edge has been found to reduce the clearance in the circularly shaped openings of the U-bolt. If a smaller U-bolt is used or larger channel openings resorted to, non-standard parts are required, increasing costs.

Accordingly, it is an object of the present invention to provide a saddle construction for a U-bolt type clamp which is of sufficient rigidity to withstand the stresses imposed by a high degree of tightening for the converter clamping applications described, but which rigidity is not so high as to preclude some deflection of the saddle clamp necessary to accommodate variations in the pipe size and hardness.

It is another object of the present invention to provide a simple and low cost construction of the saddle for a U-bolt clamp.

It is yet another object of the present invention to provide a saddle clamp construction in which the radial dimension is minimized in order to provide maximum clearance at assembly of the U-bolt clamp to the pipe connection.

It is another object of the present invention to provide such a saddle construction and method of manufacture in which spot welding of the components may be achieved with a high degree of reliability.

SUMMARY OF THE INVENTION

These and other objects of the present invention which will become apparent upon a reading of the following specification and claims, are achieved by a saddle clamp construction in which a pair of separate formed sheet steel pieces are welded together to form a saddle. Each piece is formed with a pair of channels on either side thereof, which are generally U-shaped, joined by an intermediate web having a partially circular cutout conforming to the radius of the U-bolt to which the saddle is to be assembled, to define a clamping area therebetween. The bottom edge extends relatively straight across between the U-shaped channels on one of the saddle preform pieces, while on the lower edge of the other piece there is formed a tab extending normally from the web.

The outer edges of the channels of one of the pieces are formed with welding projections which abut the opposite facing edges of the mating preform piece at assembly. Welding projections are also provided on the web of one of the preform pieces.

A stiffening rib is also provided in the web of one of the preform pieces extending between the channels.

The preform pieces are assembled with the channels. Each of a series of spot welds are provided between the web sections and along the abutting edges of the channels at the weld projections to produce a unitary clamp saddle. After welding, the tab is wrapped about the lower edge and against the outer face of the web of the mating preform piece.

The channel sides are formed substantially square to each other to produce box shaped openings receiving the U-bolt ends. This allows clearance for weld flash along the abutting edges while enabling standard sized U-bolt and flange nuts and a relatively inexpensive forming process.

It has been discovered that this configuration produces a high degree of rigidity while providing a slight degree of yieldability of the saddle clamp during tightening to provide a reliable connection despite variations in pipe size and shape. This construction has successfully been utilized for the catalytic converter application described above. The two-piece construction in which the layers of the saddle are overlying each other but are unjoined along the lower edge, combined with the single tab portion, is believed to provide just the correct degree of rigidity of the saddle of the arch between the channels.

The wrapped tab may be welded in order to provide an increased degree of stiffness of the saddle clamp for a specific application.

The flangeless construction of the channels provides a minimum radial dimension to allow maximum clearance at assembly of the U-bolt clamp to the pipe connection.

The two-piece construction enables relatively low cost forming techniques to be employed and minimizes the incidence of poor weld quality by eliminating the tendency for separation after welding of the layers as otherwise tends to occur in the one-piece folded construction described in detail above.

DESCRIPTION OF THE PREFERRED EMBODIMENT

In the following detailed description certain specific teminology will be employed for the sake of clarity and a particular embodiment will be described in accordance with 35 USC 112, but it is to be understood that the same is not intended to be limiting and indeed should not be so construed inasmuch as the invention is capable of taking many forms and variations within the scope of the appended claims.

Figure 1:
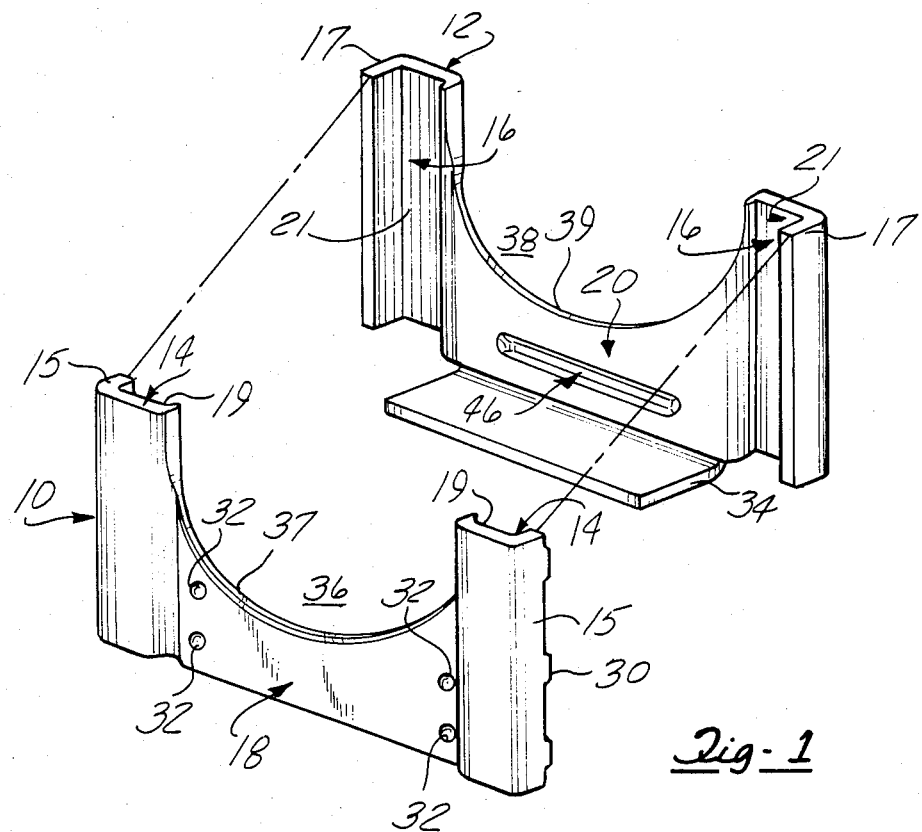
FIG. 1 is a perspective view of separated saddle preform pieces.
Figure 3:
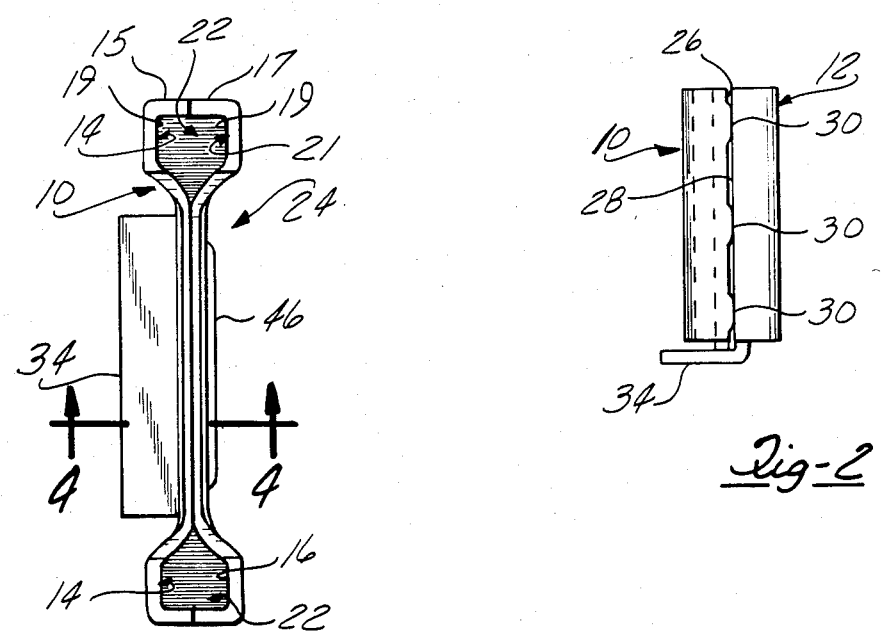
FIG. 3 is a top view of the assembled preform pieces after welding.
Figure 2:
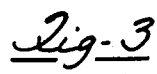
FIG. 2 is a side elevation view of the saddle preform pieces assembled together prior to welding.
Figure 4:
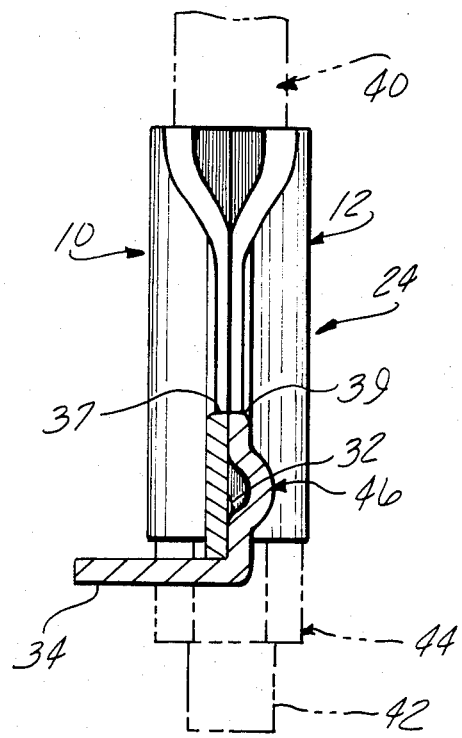
FIG. 4 is a sectional view taken through the center portion of the assembled and welded preform pieces shown in FIG. 3.

Referring to the drawings, the saddle construction according to the present invention includes two preform pieces 10 and 12 each formed along either side with parallel channels 14 and 16, respectively, which are joined by the intermediate webs 18 and 20 respectively. The channels 14 and 16 are generally U-shaped, with the outer sides 15 and 17, respectively, formed substantially perpendicular to the bottom 19 such that when the preform pieces 10 and 12 are assembled together, roughly box shaped through openings 22 are formed on either side of the clamp or saddle 24 (FIGS. 1 and 3). The outer sides 15 and 17 of each of the channels 14 and 16 have edge faces 26 and 28 which are oppositely facing to be brought into abutment upon assembly of the preform pieces 10 and 12 as shown in FIG. 2. The preform piece 10 is formed with a series of welding projections 30 along the edge face 26 which enable ready spot welding of the outer sides of the channels 14 and 16 together.

The box shaped through openings 22 have been found to provide a clearance to accept welding flash caused by welding of the edge faces 26 and 28, without requiring either undersized U-bolts or oversized flange nuts. At the same time, relatively simple low cost forming of the flanges may be employed.

The web 18 of preform piece 10 is formed with a series of welding projections 32 which similarly facilitate spot welding of the web 18 to the web 20 of the preform piece 12.

The preform saddle piece 12 is also formed with a tab portion 34 integral with the web 20, but extending normally thereto. This may incidentally provide a locating surface for the preform piece 10 at assembly.

A stiffener rib 46 is also formed into the web 20 of the preform piece 12.

After formation of the welds, the tab portion 34 is folded upwardly to be wrapped about the lower edge of the preform piece 10 and against the outer face of the web 18 to provide just the correct rigidity of the arch between the U-bolt openings 22 to enable adequate sealing pressure to be generated, while at the same time enabling sufficient yieldability to allow some conformance to slightly irregular pipe sizes and shapes.

It is this precise degree of saddle rigidity achieved by this structure which has been found to produce successful clamping of automotive catalytic converter joints.

For truck systems, welding of the tab 34 increases the rigidity sufficiently for heavier pipes and larger sizes.

Figure 5:
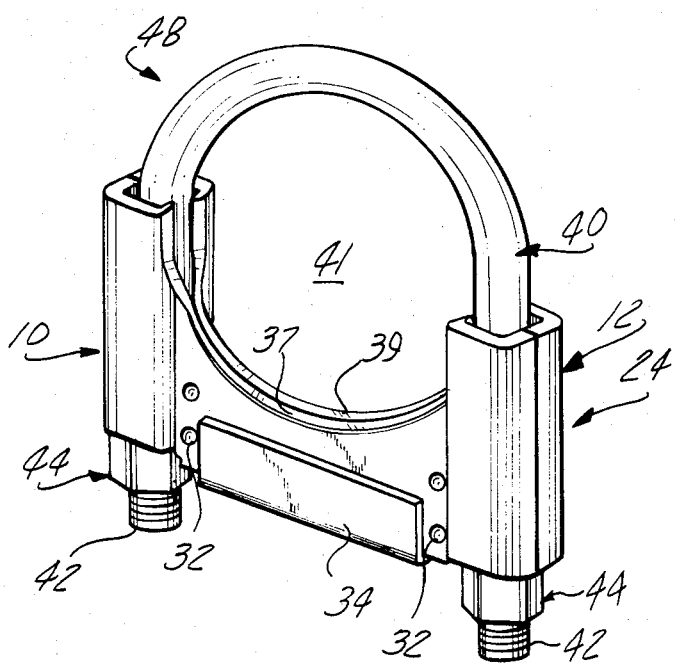
FIG. 5 is a perspective view of a U-bolt saddle clamp assembly incorporating the saddle construction according to the present invention.

Each of the preform pieces is also provided with partially circular cutouts 36 and 38, respectively, which conform with the U-bolt radius and are aligned such as to provide a generally circular opening 41 upon assembly of the U-bolt 40 to the saddle 24, as shown in FIG. 5. The cutouts 36 and 38 are chamfered along the edges 37 and 39, respectively to increase the contact pressure on the joint. The clamp 48 is assembled with the U-bolt 40, with the threaded ends 42 passing through the tubular openings 22. The tab 34 is shown in the folded position, abutting the outer surface of the web 18 of the opposite preform piece 10.

Accordingly, it can be appreciated that, by this construction and method of manufacture, the resultant clamp saddle 24 is of a high degree of rigidity due to the double thickness of the intermediate webs 18 and 20, respectively of the preform pieces 10 and 12.

At the same time the flangeless welded construction by which the channels 14 and 16 are welded together provides minimal radial dimensions for maximizing the clearance space at installation.

The degree of rigidity however, is not excessive due to the two-piece construction and the fact that the outer edges of the webs 18 and 20 of the respective preform pieces 10 and 12 are not formed as in a one-piece design, nor formed with outwardly extending ribs or flanges.

The forming of the separate preform pieces enables relatively low cost forming processes to be used to lower the cost of the clamp saddle 24. The channels 14 and 16, as best seen in FIG. 3, have their outer sides formed with a simple bending at right angles to further simplify the forming process, and to enable a flangeless two-piece construction, while using standard U-bolts and flange nuts.

The use of weld projections on the edge face 26 of the channel 14 as well as the web 18, and the two piece construction insures that a weld of high quality will be reliably produced during its manufacture.

I claim:

1. A U-bolt clamp saddle for assembly to a U-bolt having two parallel elongated ends and a radiused portion intermediate said two parallel elongated ends, said U-bolt clamp saddle comprising:

a first preformed piece formed from a first single metal sheet;

a pair of first channels formed on either end of said first preformed piece, said pair of first channels being generally U-shaped and square, said pair of first channels further being disposed parallel to each other, both of said pair of first channels opening in a first predetermined direction;

a pair of first outside edges for said pair of first channels, said pair of first outside edges being disposed parallel to each other, each of said pair of first outside edges extending from the one of said pair of first channels associated therewith in said first predetermined direction;

a generally flat first web formed in said first preformed piece between said pair of first channels, said generally flat first web having a first inner surface facing in said first predetermined direction and a first outer surface disposed opposite said first inner surface and facing in a second predetermined direction opposite said first predetermined direction;

a partially circular first upper edge formed in said generally flat first web of said first preformed piece, said partially circular first upper edge extending between said pair of first channels;

a generally linear first lower edge formed in said generally flat first web of said first preformed piece, said generally linear first lower edge extending between said pair of first channels, said generally linear first lower edge being disposed opposite said partially circular first upper edge;

a second preformed piece formed from a second single metal sheet, said second preformed piece being disposed adjacent said first preformed piece;

a pair of second channels formed on either end of said second preformed piece, said pair of second channels being generally U-shaped and square, said pair of second channels further being disposed parallel to each other, both of said pair of second channels opening in said second predetermined direction, said pair of second channels being aligned with said pair of first channels to define therebetween a pair of parallel box-shaped passageways for passage therethrough of said two parallel elongated ends of said U-bolt;

a pair of second outside edges for said pair of second channels, said pair of second outside edges being disposed parallel to each other, each of said pair of second outside edges extending from the one of said pair of second channels associated therewith in said second predetermined direction and into abutting relationship with one of said pair of first outside edges;

a first plurality of welds formed between said pair of first outside edges and said pair of second outside edges;

a plurality of weld projections formed on at least one of said pairs of first and second outside edges, said plurality of weld projections being in abutting relationship with a preselected edge of said pairs of said first and second outside edges, said first plurality of welds between said at least one of said pairs of first and second outside edges and said preselected edge being interposed between said plurality of weld projections and said preselected edge;

a generally flat second web formed in said second preformed piece between said pair of second channels, said generally flat second web having a second inner surface facing in said second predetermined direction and abutting said first inner surface of said generally flat first web and further having a second outer surface disposed opposite said second inner surface and facing in said first predetermined direction;

a partially circular second upper edge formed in said generally flat second web of said second preformed piece, said partially circular second upper edge extending between said pair of second channels, said partially circular second upper edge being disposed adjacent to and aligned with said partially circular first upper edge of said first preformed piece, said partially circular first and second upper edges cooperating with said radiused portion of said U-bolt when said two parallel elongated ends of said U-bolt are passed through said pair of parallel box-shaped passageways to form an approximately circular region therebetween;

and a tab formed in said second preformed piece, said tab extending from said generally flat second web opposite said partially circular second upper edge, said tab being deflected about said generally linear first lower edge of said first preformed piece such as to abut said first outer surface of said generally flat first web to further secure said first and second preformed pieces together.

2. The U-bolt clamp saddle of claim 1 wherein exactly one preformed piece of said first and second preformed pieces further comprises:

a stiffener rib formed in the one of said generally flat first and second webs associated with said exactly one preformed piece, said stiffener rib extending partially between the one of said pairs of first and second channels associated therewith and protruding therefrom in the one of said first and second predetermined directions away from the other of said first and second preformed pieces.

3. The U-bolt clamp saddle of claim 1 further comprising:

a stiffener rib formed in said generally flat second web of said second preformed piece, said stiffener rib extending partially between said pair of second channels at a location intermediate said partially circular second upper edge and said generally linear second lower edge and protruding from said generally flat second web in said first predetermined direction.

4. The U-bolt clamp saddle of claim 1 further comprising:

a second plurality of welds formed between said first and second inner surfaces of said generally flat first and second webs to further secure said first and second preformed pieces together.

5. The U-bolt clamp saddle of claim 1 further comprising:
- a plurality of circular weld dimples projecting from one of said first and second inner surfaces of said first and second preformed pieces in the one of said first and second predetermined directions towards the other of said first and second inner surfaces; and
- a second plurality of welds formed between said plurality of circular weld dimples and said other of said first and second inner surfaces to further secure said first and second preformed pieces together.

6. The U-bolt clamp saddle of claim 1 further comprising:
- a plurality of circular weld dimples projecting from said first inner surface of said first preformed piece in said first predetermined direction; and
- a second plurality of welds formed between said plurality of circular weld dimples and said second inner surface of said second preformed piece to further secure said first and second preformed pieces together.

7. The U-bolt clamp saddle of claim 1 further comprising:
- a third plurality of welds formed between said tab and said first outer surface of said first preformed piece to still further secure said first and second preformed pieces together.

8. A U-bolt clamp saddle for assembly to a U-bolt having two parallel elongated ends and a radiused portion intermediate said two parallel elongated ends, said U-bolt clamp saddle comprising:
- a first preformed piece formed from a first single metal sheet;
- a pair of first channels formed on either end of said first preformed piece, said pair of first channels being generally U-shaped and square, said pair of first channels further being disposed parallel to each other, both of said pair of first channels opening in a first predetermined direction;
- a pair of first outside edges for said pair of first channels, said pair of first outside edges being disposed parallel to each other, each of said pair of first outside edges extending from the one of said pair of first channels associated therewith in said first predetermined direction;
- a generally flat first web formed in said first preformed piece between said pair of first channels, said generally flat first web having a first inner surface facing said first predetermined direction and a first outer surface disposed opposite said first inner surface and facing in a second predetermined direction opposite said first predetermined direction;
- a plurality of circular weld dimples projecting from said first inner surface of said first preformed piece in said first predetermined direction;
- a partially circular first upper edge formed in said generally flat first web of said first preformed piece, said partially circular first upper edge extending between said pair of first channels;
- a generally linear first lower edge formed in said generally flat first web of said first preformed piece, said generally linear first lower edge extending between said pair of first channels, said generally linear first lower edge being disposed opposite said partially circular first upper edge;
- a second preformed piece formed from a second single metal sheet, said second preformed piece being disposed adjacent said first preformed piece;
- a pair of second channels formed on either end of said second preformed piece, said pair of second channels being generally U-shaped and square, said pair of second channels further being disposed parallel to each other, both of said pair of second channels opening in said second predetermined direction, said pair of second channels being aligned with said pair of first channels to define therebetween a pair of parallel box-shaped passageways for passage therethrough of said two parallel elongated ends of said U-bolt;
- a pair of second outside edges for said pair of second channels, said pair of second outside edges being disposed parallel to each other, each of said pair of second outside edges extending from the one of said pair of second channels associated therewith in said second predetermined direction and into abutting relationship with one of said pair of first outside edges;
- a plurality of weld projections formed on at least one of said pairs of first and second outside edges, said plurality of weld projections being in abutting relationship with a preselected edge of said pairs of first and second outside edges;
- a first plurality of welds formed between said pair of first outside edges and said pair of second outside edges, said first plurality of welds between said at least one edge and said preselected edge being interposed said plurality of weld projections and said preselected edge;
- a generally flat second web formed in said second preformed piece between said pair of second channels, said generally flat second web having a second inner surface facing in said second predetermined direction and abutting said first inner surface of said generally flat first web and further having a second outer surface disposed opposite said second inner surface and facing in said first predetermined direction;
- a second plurality of welds formed between said plurality of circular weld dimples of said first preformed piece and said second inner surface of said second preformed piece to futher secure said first and second preformed pieces together;
- a partially circular second upper edge formed in said generally flat second web of said second preformed piece, said partially circular second upper edge extending between said pair of second channels, said partially circular second upper edge being disposed adjacent to and aligned with said partially circular first upper edge of said first preformed piece, said partially circular first and second upper edges cooperating with said radiused portion of said U-bolt when said two parallel elongated ends of said U-bolt are passed through said pair of parallel box-shaped passageways to form an approximately circular region therebetween;
- a tab formed in said second preformed piece, said tab extending from said generally flat second web opposite said partially circular second upper edge, said tab being deflected about said generally linear first lower edge of said first preformed piece such as to abut said first outer surface of said generally flat first web to further secure said first and second preformed pieces together; and
- a third plurality of welds formed between said tab and said first outer surface of said first preformed piece to still further secure said first and second preformed pieces together.

* * * * *